Nov. 13, 1956   E. P. OLMSTED ET AL   2,770,164
CORRECTION OF THE CONDITION OF STRABISMUS IN HUMAN VISION
Filed March 25, 1952   2 Sheets-Sheet 1
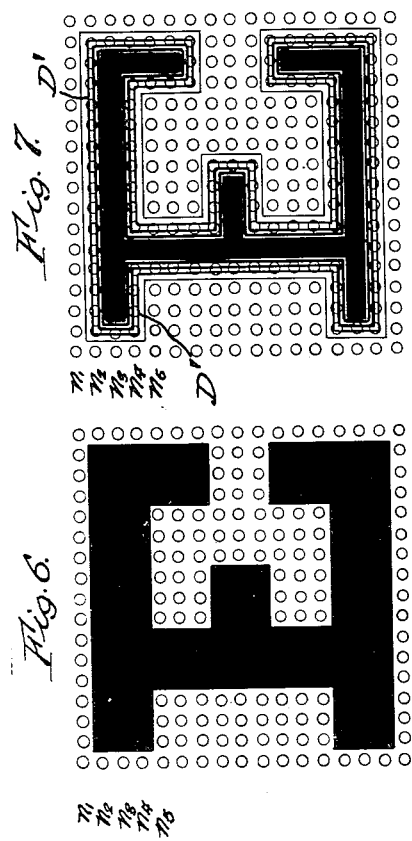
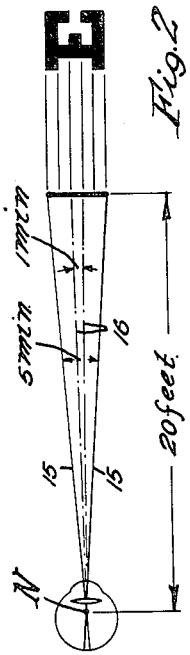
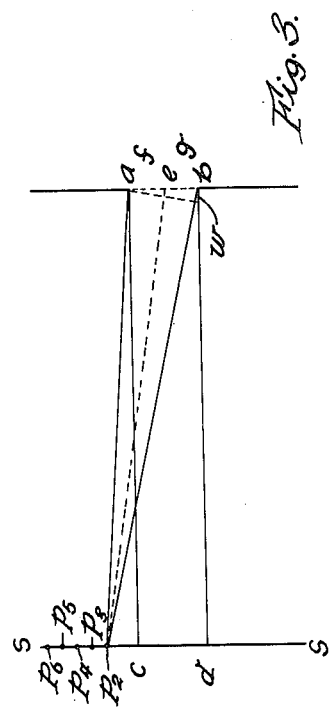
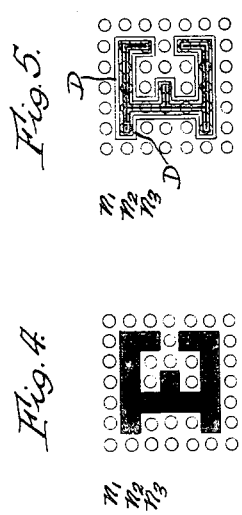
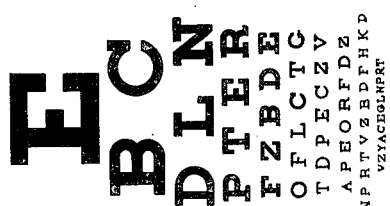
INVENTORS.
Elizabeth P. Olmsted
Richard R. Francis
Ira G. Ross
BY Popp and Sommer
ATTORNEYS.

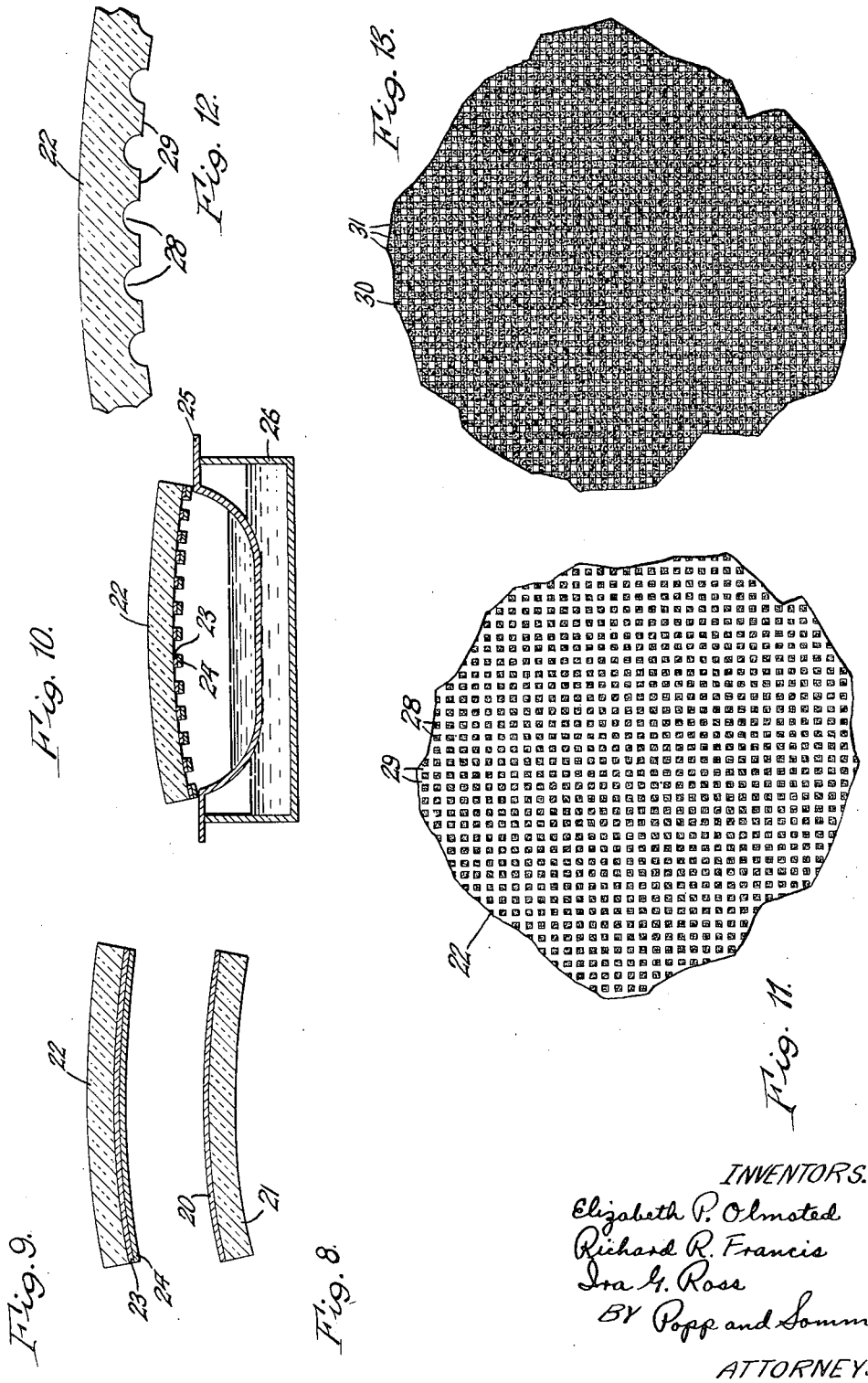

United States Patent Office 2,770,164
Patented Nov. 13, 1956

2,770,164

CORRECTION OF THE CONDITION OF STRABISMUS IN HUMAN VISION

Elizabeth P. Olmsted, Buffalo, Richard R. Francis, Tonawanda, and Ira G. Ross., Buffalo, N. Y.

Application March 25, 1952, Serial No. 278,334

5 Claims. (Cl. 88—20)

This invention relates to the correction of the condition of strabismus in human vision.

The phenomenon of strabismus or squint in human vision is a failure of the subject's eyes to converge their optical axes upon an object in such a manner as to obtain simultaneous macular perceptions and fusion of the images in the two eyes to form a single mental impression. The inability of the eyes to maintain fusion may be caused by an anomaly of the extra-ocular muscles which interferes with the necessary coordination of the globes or eyeballs and renders the proper convergence of the optical axes difficult or impossible. It may also be due to refractive error of one or both eyes. In cases of excessive refractive error in both eyes, the accommodation-convergence balance is taxed and an accommodative squint results. In cases of unequal refractive powers, the normal accommodation-convergence relationship cannot be established or there results the formation of disproportionate retinal images and fusion is again disturbed.

Regardless of its primary cause, squint usually results in the physiological or psychological suppression and decrease of visual acuity of one eye in order to avoid the incompatibility of the double vision. This suppression then forms a serious impediment to the development of normal fusion. Refractive error may be adequately compensated by the wearing of appropriate optical lenses. It has also been demonstrated, in children under 10 years of age, that by complete occlusion of the good eye over a period of time the decreased visual acuity of the poor eye may be improved to normal or nearly normal. In some cases, this regime will correct existent muscular deviation and establish the potential of binocular single vision. In cases when a manifest strabismus is still present, surgical intervention may be necessary to overcome muscular imbalance or to assist a paretic extra-ocular muscle before the potential of fusion is effected. Prismatic lenses may also be incorporated in the spectacles to aid alignment of the optical axes. However, after correcting the refractive errors, reclaiming visual acuity and aligning the visual axes, with all the potential established for development of simultaneous macular perception and fusion, it is frequently found that the subject may still continue to suppress the affected eye. Visual exercises are then instituted in an endeavor to train the subject in the art of using both eyes. Orthoptic techniques of training with the stereoscope, the rotoscope, the synaptophore, etc., may initiate the subject to the experience of seeing with both eyes and uniting the visual impressions. This aids in overcoming the complete suppression of the affected eye. But these exercises are practically limited to, say, half hour periods weekly or bi-weekly and during the remaining waking hours the eyes are left to their own inclination, which in many cases is a return to monocular vision and suppression of the reclaimed eye. This fact is borne out by the frequency in which the initially attained increase in visual acuity is found to recede with passing time even with continued orthopic help. The need, then is to encourage the use of this eye in fusion in the normal daily life of the subject.

The principal object of our invention is to provide a method and apparatus by which the visual acuity in the preferred eye is reduced to a degree equal to one or more lines of the Snellen test chart below that of the poorer eye so that a situation will be induced which will offer an incentive for the constant use of both eyes. The acuity must be reduced enough to yield a relatively clearer image in the previously amblyopic eye than in the good one. This tends to stimulate the constant use of the suppressing eye since it now yields the better detailed vision. At the same time the preferred eye retains a sufficiently taneous perception is initiated and the incentive to fusion well-defined image that it cannot be ignored. Thus, simultaneous is constantly maintained.

A further important object of our invention is to provide such method and apparatus which produces this reduction in acuity over a wide range of visual situations and without introduction of deleterious secondary effects. For example, overcorrection of the preferred eye by the application of a spherical spectacle lens of excessive power will initially "fog" this eye's image but will call forth a compensative effort of the accommodative muscles and upset the accommodative-convergence balance. Again, simple partial opacity of the preferred eye's spectacle, as by smoking, tinting or frosting will not uniformly reduce its response under the normally wide range of stimulus intensity or color distribution encountered in daily use.

Another aim of our invention is to accomplish the foregoing objectives simply by means of interposing a spectacle lens of special construction before the preferred eye so as to reduce the visual acuity or resolving power of such eye the necessary amount below that of the suppressed eye to produce the desired binocular single vision.

A further object is to provide such a special spectacle lens which is difficult to be distinguished by the casual observer from an ordinary clear spectacle lens and therefore does not detract from the appearance of the person wearing the same.

A further object is to produce such special spectacle lens in a comparatively simple, inexpensive and efficient manner.

Other objects and advantages will be apparent from the following description and accompanying drawings in which:

Fig. 1 is a greatly reduced view of a typical Snellen chart.

Fig. 2 is a diagram illustrating the dimensional factors forming the basis of construction of a Snellen chart, these factors being greatly exaggerated for illustrative purposes only.

Fig. 3 is a diagram illustrating in exaggeration the phenomenon of light waves passing through a narrow slit and falling upon a screen and producing diffraction bands outside the limits of the geometrical beam.

Fig. 4 is a fragmentary diagrammatic representation of the light receiving surface of the retina of a human eye having about 20/20 vision and showing the rows and spacing of photo-sensitive nerve cells with the image of the letter E reflected from line 20/20 of the Snellen chart superimposed thereon.

Fig. 5 is a view similar to Fig. 4 but showing the image produced by interposition before the eye of a spectacle lens constructed in accordance with the present invention.

Fig. 6 is a view similar to Fig. 4 but showing the retinal letter E reflected from line 20/50 of the Snellen chart.

Fig. 7 is a view similar to Fig. 6 but showing the image produced by interposition before the eye of a spectacle lens constructed in accordance with the present invention.

Fig. 8 is an enlarged cross sectional view of a plano spherical spectacle lens used in producing the novel spectacle lens of our invention according to a preferred method of etching.

Fig. 9 is a view similar to Fig. 7 of a spectacle lens to be etched.

Fig. 10 is a vertical sectional view through apparatus employed in carrying out the etching process.

Fig. 11 is a fragmentary view, on an enlarged scale, of the final etched face of the spectacle lens.

Fig. 12 is a fragmentary enlarged cross sectional view thereof.

Fig. 13 is a face view of a spectacle lens embodying our invention and similar to Fig. 11 but with the arrangement of the light transmitting and light interrupting areas reversed.

The eye's ability to resolve detail, as is well-known, is related to the spacing of photo-sensitive nerve cells upon the retinal surface, such cells being illustrated at $n$ in Figs. 4–7. These cells have an average spacing of 0.04 millimeter in the actual retina. Two dark lines of an object upon a light field are observed by the eye as separate lines if their spacing and distance from the eye result in retinal images falling upon discrete lines of nerve cells separated by a line of cells independently stimulated by light from the intervening field space. If they are closer than this their images fall upon common cells with that of the intervening field, resolution or the ability to detect clarity of outline is lost and the lines appear as a single greyish line. Therefore the spacing of the photo-sensitive cells and the precision and quality of the lens of a particular eye determine the critical angular spacing between objects which it can resolve.

In the average normal eye clear resolution results when the lines subtend individual widths of one minute of arc and the intervening contrast space a like angle. This property is illustrated in the Snellen eye chart widely employed as a test of relative visual acuity and illustrated in Fig. 1. The Snellen chart comprises letters of graded sizes, so constructed that each part, or limb, of the letters subtends an angle of one minute, while the whole letter subtends an angle of five minutes for a given distance. The shape of each letter is such that it can be enclosed in a square designed to be five times as wide as the parts composing the letter. The visual angle is formed by the convergence of two straight lines drawn from the extremities of an object at the nodal point of the eye. This is illustrated in Fig. 2 for 20/20 vision where an object shown as the letter E is positioned so that it is a distance of twenty feet from the nodal point N of the eye and the letter E is so proportioned that lines 15—15 drawn from the top and bottom borders of this letter to the nodal point N form an angle of five minutes and any part or spacing between parts of the letter E such as its center bar subtends an angle of one minute formed by the lines 16—16. The angles, distances and proportions are exaggerated in Fig. 2 to facilitate illustration of the principle.

Therefore the normal vision or 20/20 line of the Snellen chart comprises block letters so sized and proportioned that, at an eye twenty feet distant, the letter elements and intervening spaces subtend, respectively, angles of one minute. A normal eye will resolve intelligible images of these letters. Alternative lines on this chart of larger or smaller letters of the same proportions are designated "20/25," "20/15," etc. An eye subnormal by "one line" of the Snellen chart would reach its threshold of intelligible resolution at the "20/25" line. That is to say it would resolve at twenty feet objects resolvable at twenty-five feet by the normal eye. The "20/25" letter elements and spaces subtend angles of $$\frac{25}{20}$$

of one minute; the "20/15" elements $$\frac{15}{20}$$

of one minute. Successive lines of the Snellen chart comprise letters made up of bars and spaces subtending $$\frac{30}{20}, \frac{40}{20}, \frac{50}{20}, \frac{70}{20} \text{ and } \frac{200}{20}$$

of one minute, respectively, describing successively poorer visual acuity or resolving power. The chart also includes a bottom line designated 20/10 for measuring particularly acute vision.

Consider now an eye whose limit of intelligible resolution is reached at the 20/20 line of the Snellen chart. The images of adjacent letter elements and of the intervening space are focused upon the retina by the eye lens with sufficiently sharp definition and fall upon retinal cells adequately isolated in their patterns of mental stimulus to be perceived as discrete entities. The form of the letter is then intelligibly recognized. When this same eye observes a letter of the 20/15 line its optical imperfections or the physical or mental interconnections between photocells stimulated by adjacent elements of the smaller image prevent their separate mental perception and an intelligible impression is no longer recognized.

In accordance with our invention we have made and clinically tested a special spectacle lens which effects a reduction in the eye's resolving power equivalent to one or more lines of the Snellen chart under a wide range of illuminative conditions and by an optical mechanism which cannot be overcome by accommodative effort of the eye. Our invention may be carried out with whatever standard spectacle lens the given eye may require to correct its particular refractive deviations from normal.

Our invention is founded on the concept of decreasing visual acuity by diffracting light reflected from the object looked at by the eye so as to produce a diffused retinal image of such object. This is accomplished by providing one side of a spectacle lens with a suitable arrangements of light transmitting and light interrupting areas. The light transmitting areas may be provided by treating one surface of the spectacle lens so as to interrupt the transmission of light in the normal manner of the lens through portions thereof and leaving either narrow bands or small distinct portions of such surface unaffected to transmit light in the normal manner but with diffraction. Such narrow bands of the clear lens surface may be considered as light transmitting slits and the small distinct portions of clear lens surface may be referred to as light transmitting "pin holes."

It is essential that the light transmitting and light interrupting areas be of such form or arranged in such a pattern on the spectacle lens that light directed toward the retina of the eye is diffracted in more than one direction. For example, if the light transmitting areas were all in the form of parallel horizontal slits, light transmitted through these slits would be diffracted to provide a fringe effect only along the horizontal edges of images viewed by the eye, leaving other edges extending in other directions, such as the vertical, unaffected. While it is not essential that diffraction band effect must be produced along perpendicular axes, it should be produced in at least two different directions so that substantially the full outlines of contrasting areas making up an image are fringed with such diffraction bands.

It is preferred that the light transmitting areas which diffract light in one direction each produce the same fringe spread so as to eliminate the possibility of undesirable cancellations or reinforcements of diffraction band effects.

While the light transmitting areas may be distributed at random on the surface of the spectacle lens, it must be kept in mind that the eye is movable relative to the spectacle lens, therefore making it desirable to arrange the light transmitting areas over the full lens surface according to a regular pattern so that uniform vision is obtained when looking through different portions of the lens. The regular pattern preferred and illustrated is a grating formed by two series of mutually perpendicular and crossing lines with each series being composed of a multiplicity of parallel and spaced lines. However, even with such preferred perpendicular pattern the light transmitting areas may be formed either by intersecting perpendicular lines bordering rectangular light interrupting areas, or by areas bordered by intersecting perpendicular lines which interrupt the transmission of light.

By "light interrupting areas" is meant areas which interrupt the transmission of light either by total occlusion or by translucence, whether by cylindrical lens action or by irregular scattering. It is essential that the light transmitting areas be of such size that diffraction of the light transmitted therethrough occurs.

In order that the import of our invention can be better comprehended, it is deemed desirable at this point to consider briefly the phenomenon of diffraction produced by a beam of light passing through an aperture or slit. For this purpose, reference is made to Fig. 3 where a beam of light in the form of a train of short waves which, proceeding from a distant source, pass through an opening $ab$ and fall upon a screen $s$—$s$. The opening $ab$ may be considered analogous to one of the light transmitting slits or "pin holes" in a spectacle lens made in accordance with our invention, and the screen $ss$ may be considered analogous to the retina of an eye. For simplicity, the screen $ss$ representative of the retina is shown as a flat plane. Also, for simplicity of explanation it is assumed that a distant source of light is chosen so that the wave front of the disturbance which reaches the aperture $ab$ may be practically a plane, and thus admit of the consideration of all the particles lying in the plane of the aperture as being in the same phase of vibration. The length $ab$ is also assumed to be large as compared with the wave length of the train of waves.

The lines $ac$ and $bd$ are drawn from the source, assumed to be a point; past the edges of the opening $ab$ and to the screen, these lines marking the limits of the geometrical beam. Suppose that the wave length and the opening $ab$ are so related that the point $p_2$ on the screen, for which the distance $bp_2$ is exactly one wave length (represented at $w$) greater than the distance $ap_2$, falls outside the limits of the geometrical beam. Then the particles at $a$ and $e$ will differ in distance to $p_2$ by a half wave length. Hence, as is well known, the vibrations produced at $p_2$ by these two particles mutually neutralize each other. Similarly the disturbance originating at the first particle below $a$ will at $p_2$ be just one-half wave length ahead of the disturbance coming from the first particle below $e$. Thus every particle between $a$ and $e$ may be paired off with a corresponding particle between $e$ and $b$ such that the effects of the two particles neutralize each other at $p_2$. Hence the total effect at $p_2$ of the disturbances coming from the portion $ae$ of the opening is completely neutralized by the effect of the disturbances coming from the portion $eb$ of the opening.

Let there next be considered a point $p_4$ which is so situated that the distance $bp_4$ is two wave lengths more than the distance $ap_4$. The opening $ab$ may now be divided into four parts, $af$, $fe$, $eg$, $gb$, such that $fe$ neutralizes at $p_4$ the effect of $af$, since $fp_4$ is one-half wave length more than $ap_4$, and $gb$ neutralizes the effect of $eg$, since $gp_4$ is one-half wave length more than $ep_4$. There is therefore no disturbance at all at $p_4$.

At some point $p_3$, between $p_2$ and $p_4$, the distance $bp_3$ will be one and a half wave lengths more than $ap_3$. If $ab$ is now divided into three equal parts, the effect of the upper third will be completely neutralized at $p_3$ by that of the next lower third, but the effect of the lowest third has nothing to neutralize it at $p_3$. Hence there is a disturbance at $p_3$ which is due simply to one third of the particles between $a$ and $b$, and even the effects of the particles in this third partly neutralize one another at $p_3$ since they differ somewhat in phase. It is obvious that between $p_2$ and $p_4$ the disturbance increases from zero at $p_2$ to a maximum at $p_3$, and then falls gradually to zero at $p_4$. It will further be seen that there are other points of zero disturbance above $p_4$, such as $p_6$, so situated that the distance from $b$ to $p_4$ the point in question is any even number of half wave lengths more than the distance from $a$ to this point; and that between these points of zero disturbance are points of maximum disturbance, such as $p_5$, so situated that the distance from $b$ to the point in question is any odd number of half wave lengths more than the distance from $a$ to this point. It will also be noticed that the successive maxima, $p_3$, $p_5$, etc., diminish rapidly in intensity, since, while but two thirds of the particles between $a$ and $b$ completely neutralize one another's effects at $p_3$, four fifths of these particles neutralize one another's effects at $p_5$, six sevenths at $p_7$, etc. Hence it is not necessary to go a great distance above $c$ in order to reach a region in which there are no points at which there is any appreciable disturbance.

Further, if wave lengths which are shorter and shorter in comparison with $ab$ are considered, the points of maximum disturbance, $p_3$, $p_5$, etc., draw closer and closer together, and soon some of them begin to fall inside the limits of the geometrical beam, that is, below point $c$ on the screen. Hence those that are left above $c$ are weaker and weaker members of the series. It follows, therefore, that when the wave length becomes very short in comparison with $ab$, the disturbance will have become practically zero at a very short distance above the point $c$.

If the opening $ab$ is considered as a narrow slit the points of maximum and minimum disturbance on the screen form alternately light and dark bands, called diffraction bands, running along the upper and lower edges of the geometrical beam. If the opening $ab$ is considered as a small aperture in the nature of a "pin hole," the image of the geometrical beam on the screen will be surrounded by diffraction bands. As pointed out above, the spread of the diffraction bands is determined by the dimensions of the opening $ab$ and the farther a light diffraction band is from the corresponding geometrical beam limit, the weaker it is in intensity.

This diffraction band phenomenon is employed in carrying out our invention. The spectacle lens having on its surface the grating of light transmitting and interrupting areas is so designed that the size of each light transmitting area produces a diffraction band effect of the desired spread on the retina to produce a multiple fringe rather than a single image when a line of light or of demarcation between light and dark is focused upon the retina after transmission through the spectacle. The narrower such light transmitting area is the greater the fringe or diffraction band spread and vice versa, considering all other factors such as wave length remain constant. A spectacle lens having a multiplicity of light transmitting areas, whether in the form of slits or "pin holes," will produce the same diffraction band effect described above in the theoretical analysis for a single light transmitting opening.

The effect of interposing a spectacle lens having a grating of the described type before an eye having about 20/20 vision to modify the retinal image, will now be considered. The sharp line of demarcation between light and dark areas of the retinal image is modified by the interference mechanism of a regular optical grating into a fringe region of alternate light and dark lines due to diffraction. The spread of these fringes on the retina depends upon the geometry of the grating, wave length of light and optical dimensions of the eye-lens system. If the fringe spread is such as to cover a substantial part of the retinal image-width of letter-element interspace for a given letter on the Snellen chart, the condition no longer maintains of independent perception of the light and dark areas of the letter. The originally light and dark areas of the unmodified image have been invaded by fringe structure until, when observing a letter of the 20/20 line of the Snellen chart, the residual areas of full contrast fall below the dimensional limits of resolution of the photo-mental mechanism of the eye in question. If the fringe or diffraction bands are not too wide, however, this eye-spectacle combination will still find in the image of a 20/25 letter sufficient residual areas of undisturbed light and dark contrast for intelligible recognition of the letter form. This 20/25 line now defines the limit of resolution of the eye with spectacle. The eye's resultant acuity with the spectacle has been reduced by one Snellen line. If the grating of the spectacle has been so constructed as to yield wider fringe or diffraction bands along a line of light and dark demarcation, a reduction of two Snellen lines to the 20/30 resolution limit will result.

The effect of an image produced on the retina of an eye by a grated spectacle lens constructed in accordance with our invention is illustrated schematically in Figs. 4–7. In Fig. 4, the nerve ends $n$ in a fragment of the retina are shown greatly enlarged and equally spaced in horizontal and vertical rows and the image of the letter E reflected from, say, line 20/20 of the Snellen chart is shown as superimposed thereon. This letter E is considered as black formed on a light field so that the nerve ends $n$ exposed in Fig. 4 are stimulated by light reflected from the field whereas those not illustrated are not stimulated by light and, so to speak, are covered by the image of the letter E. Thus light and dark, or the absence of light, stimulation of independent nerve cells in discrete rows of the same permit intelligible perception of the letter form. However, if a grated spectacle lens, such as illustrated in Figs. 11 or 13, and having a square array of light transmitting areas is interposed before the eye in the path of the image, the retinal image illustrated in Fig. 5 will be produced. In Fig. 4, the outline of the retinal image of the letter E is defined by areas of clear cut light and dark contrast falling upon discrete rows of nerve cells. This permits intelligible mental perception of the retinal image because, considering the top horizontal bar of the retinal image shown in Fig. 4, horizontal rows $n_1$ and $n_3$ of nerve cells are stimulated by light whereas the intervening horizontal row $n_2$ is not stimulated. The same analysis applies to other horizontal and vertical parts or limbs of the image of the letter E.

Now when the light forming this retinal image is diffracted in accordance with our invention, the sharp lines of demarcation between light and dark areas which previously formed the outline of the retinal image are destroyed and instead there is a fringe of diffraction bands which borders the retinal image. Comparing Fig. 5 with Fig. 4, it will be seen that the previously fully dark areas have been invaded by diffraction bands which fall upon the intervening previously unstimulated rows of nerve cells. For example, the intervening row $n_2$ is now stimulated by the fringes of diffraction bands D along opposite sides of the top horizontal bar of the letter E, whereas this row was not previously stimulated by light. Since there is now no adjacent rows of nerve cells subjected respectively to light and dark stimulation, the letter E is no longer intelligibly recognizable. In other words, diffraction has reduced the residual areas of full light and dark contrast below the dimensional limits of resolution of the eye in question. However, a letter of larger size, such as one selected from line 20/25 of the Snellen chart, could be intelligibly resolved, depending upon the fringe spread.

This is demonstrated in an exaggerated manner in Figs. 6 and 7 where the letter E has been selected from line 20/50 of the Snellen chart. In Figs. 6 and 7, the size and spacing of the nerve cells $n$ are illustrated the same as in Figs. 4 and 5 but the retinal image of the letter E is illustrated in Fig. 6 as about three times the size of that represented in Fig. 4. Referring to Fig. 6, it will be seen that the dark areas of the retinal image and which form the shape of the letter E leave in any part of this image three adjacent rows of nerve cells unstimulated by light whereas the cells surrounding the image are stimulated by light. For example, with the top horizontal bar of the image shown in Fig. 6, horizontal rows $n_2$, $n_3$, $n_4$ of nerve cells are unstimulated, whereas the bordering horizontal rows $n$, and $n_5$ are stimulated. Considering an eye with a visual acuity of 20/20, the retinal image shown in Fig. 6 is readily perceived. Now when the light forming this retinal image is diffracted in accordance with our invention, the retinal image illustrated in Fig. 7 will be produced. Thus diffraction band fringes invade the marginal portions of the previously fully dark areas but it will be noted that the central portions of the initially dark areas still leave the center row of nerve cells unstimulated so as to provide a distinct light and dark stimulation contrast within the dimensional limits of resolution for the eye which will permit the image to be intelligibly recognized. However, the retinal image will have a "greyish" outline instead of the former image of sharply demarked light and dark contrast. Referring to Fig. 7, the diffraction bands D' have spread part way into the previously fully dark areas so as to narrow the solid dark areas but as shown such narrowed solid dark areas are still broad enough to prevent stimulation of the underlying rows of nerve cells. Thus, considering the top horizontal bar of the image in Fig. 7, the diffraction bands D' of alternate light and dark lines have stimulated the nerve rows $n_2$ and $n_4$ which will be perceived as a greyish hue but the intervening nerve row $n_3$ will remain unstimulated. Since contrasting areas of light and dark fall upon discrete rows of nerve cells, notwithstanding partial light stimulation of an intervening row of nerve cells, the image is intelligibly recognized.

It will be appreciated that the representation of the nerve cells in Figs. 4–7 is schematic as is also the effect of their stimulation by the images illustrated in these figures, it being intended only to graphically depict the phenomenon which takes place with the practice of our invention in order to facilitate explanation of the same.

While spectacle lenses having gratings of the type described can be manufactured by diamond ruling, pressing or other processes, a method which we have found economical and convenient is in photo-etching in the following manner, analogous to that employed in making photo-engraved printing plates.

A line screen having the proportions desired in the grating is photographed on a stripping film to a size yielding the grating dimensions desired. The line screen may be a ruled glass or half-tone screen used by photoengravers. The stripping film consists of two layers, one very thin containing a photosensitive emulsion and the other relatively thicker and offering protection for the thin layer. The stripping film is developed as ordinary photographic negatives are to provide transparent and opaque areas which reproduce the pattern of the grating, and while the two layers are wet they are separated. The developed emulsion coated layer or negative 20 is transferred to the convex side of a plano spectacle lens 21 as shown in Fig. 8. This convex face has been previously ground and polished to three diopters and has a curvature corresponding to that of the back or concave face of the lens 22 to be etched shown in Fig. 9. It is difficult to form the film layer 20 to a curved surface since the film is flat and the lens surface is spherical. Therefore, it is necessary to shape the film layer 20 to the curvature of the convex face of the lens 21. This is done by applying a commercial stripping solution or cement to the lens and film layer. This softens the film layer very slightly but enough to bend or form it to the desired curvature. When it dries it is firmly attached to the lens. The stripping film is commercially available at photoengraving supply stores.

The lens 22 to be etched is thoroughly cleaned, as by a two hour immersion in a solution of trisodium phosphate followed by removal and drying. The concave or rear face of the cleaned lens 22 is then coated with a photo-sensitive preparation described hereinafter. It is essential that the concave face of the lens 22 be moistened by steam before the photo-sensitive coating is applied, otherwise, it will not adhere. The photo-sensitive preparation is applied by pouring the same on the concave face of the lens 22 following which the lens is twirled and dried as by holding over a hot plate to yield a uniform coating as shown at 23 in Fig. 9.

The aforementioned photo-sensitive preparation is formulated as follows, the various amounts indicated being by weight. 4 ounces of flake albumen are dissolved in 20 ounces of distilled water for about 12 hours and the solution is thereafter strained as through cheesecloth. A separate solution is prepared by dissolving 150 grains of ammonium dichromate in 12 ounces of distilled water and thereafter 1 ounce of glue is added. This second solution is added to the first solution and thoroughly and vigorously mixed to produce the photo-sensitive preparation.

The dried coating 23 of the lens 22 is then covered with a second coating of photo-engraver's "cold top enamel" in a similar manner as by pouring, twirling and drying. This second coating indicated at 24 in Fig. 9 will serve as the acid resisting mask of the etching process. The baking of the enamel is critical. If not sufficiently hardened it will not adhere during photographic development. If too hard it will prevent penetration of the developing solution and prevent development.

The "cold top enamel" referred to is prepared by adding a small portion of 1 pound of orange shellac to 160 ounces of hot water having a temperature of about 185° F. To this is added 3½ ounces of ammonium carbonate and immediately thereafter the remainder of the shellac is slowly added while the mass is stirred. This mixture is heated for 15 to 20 minutes and then allowed to cool and is stirred occasionally while cooling. Then 5 ounces or 150 cc. of concentrated ammonia is added to the cooled mixture with constant stirring. To this is then added, with constant stirring, a sensitizer solution comprising 360 grains of ammonium dichromate and 250 cc. of cool water. The resulting preparation is set aside for 24 hours and then filtered through cheesecloth or canton flannel.

After the lens 22 with its double coating 23 and 24 has cooled, the lenses 21 and 22 are brought together with the convex side of the former against the concave side of the latter and held in a suitable printing frame. The coatings 23 and 24 are then exposed to light admitted through the negative 20. The exposure is made by a photoflood lamp at three feet directed toward the concave side of the lens 21 and typical exposure time is eight minutes but sometimes varies because of the age of the solutions. Preferably a sheet of black paper is placed against the convex side of the lens 22 during exposure to reduce reflections.

After exposure the lenses 21 and 22 are separated and the coating on the lens 22 developed in alcohol, conveniently dyed for visual control. The alcohol softens the unexposed portions of the ammonium dichromate layers 23 and 24 so that, after 2½ minutes of immersion, water rinsing and careful swabbing with cotton, these layers will be removed from those areas which were previously covered by such unexposed portions. The lens 22 may now be dried and heated to a high degree over a hot plate thoroughly to harden the top enamel remaining over the exposed portions of the coatings on the lens making such portions impervious to etching and thereby protecting the underlying surface of the lens.

Etching is accomplished by condensing hydrofluoric acid vapor on the concave side of the lens 22. For this purpose, a small wax coated container or tray 25 having a spherical recess containing a body of a 50% aqueous solution of hydrofluoric acid, is set over the open upper end of a pan 26 containing water as shown in Fig. 10. The lens 22 is first cooled and placed over the recess in the tray 25 which recess is approximately the diameter of the lens. The acid solution, when heated by the water bath to a temperature of a few degrees above that of the lens, yields acid vapor which condenses on the lens to attack its uncoated surface areas. This vapor condensation method is employed to avoid any mechanical disturbance of the protective enamel and to give an even and gentle application of the acid. Etching is allowed to proceed for 12 to 15 minutes after which the process is stopped by thoroughly washing the lens 22 in running water, this washing also serving to remove the coatings from the protected surface areas of the lens. The convex face of the etched lens may then be ground to provide the desired refractive power.

The appearance of the lens 22 when viewed from the concave side thereof is shown in Fig. 11, and a cross section of a fragment of the same is shown on an enlarged scale in Fig. 12, these views being on a greatly exaggerated scale. It is to be noted that the time of etching controls to some degree the width of the etched areas or dished recesses 28 of the grating and the resultant narrowness of the intervening spaces 29. As the etching process proceeds it first attacks the uncoated areas of the lens surface. As the depth of attack develops, edge undercoating beneath the coated lines reduces the unaffected area. In the finished grating the narrower the light transmitting slits 29 are, the wider the fringes on the retina are for a transmitted line of light-dark demarcation and, as explained hereinabove, the greater the loss of resolution.

Using a photographic negative of 75 lines per inch, with equal width of line and interspace, we have found that the process described will, with twelve minutes of etching, produce a spectacle causing a loss in visual acuity of one line on the Snellen chart. If the etch is allowed to proceed for thirteen minutes a two line loss is achieved and a three line loss for fourteen to fifteen minutes.

It is to be clearly understood that the practice of the invention is not limited to the use of a grating having 75 lines per inch. The number of light transmitting lines or slits in the spectacle lens is secondary in importance to the primary factor of their width for it is their width which determines the fringe spread of diffraction bands. If the clear slits are too wide, there is not enough fringe spread produced to render the lens effective for the purpose intended. If the clear slits are too narrow a spectroscopic color effect is produced which is undersirable. Thus a clear slit having a width of about 0.015 inch produces little loss in visual acuity, while a width of about 0.001 inch gives a great loss in acuity but with a color fringe effect which is generally undesirable. Thus the effective dimensional variation of the light transmitting lines may be said to range from about 0.001 to about 0.015 inch. This same critical dimensional range applies to the width of small apertures or "pin holes" if used instead of light transmitting slits. The selection of a width within this range for a given person will vary with the characteristics of the favored eye and the degree which it is determined necessary to suppress this eye to correct the particular condition of strabismus.

It will be noted that with the grating proportions illustrated in Fig. 11, the etched areas 28 occupy 25% of the lens surface effecting a like reduction in useful light transmission. If, instead this arrangement is reversed as illustrated in Fig. 13 where 30 represents etched area and 31 clear or unetched area in the nature of a "pin hole," there is a 75% reduction in useful light transmission. Because, however, of the well-known logarithmic relationship between light stimulus and visual perception, this reduction of light transmission is of negligible importance in visual effect. The efficacy of the grated lens in reducing visual acuity lies, rather, in its effect upon the resultant eye-spectacle combination in respect to the resolution in detail.

It is to be understood that the patterns of the light transmitting and light interrupting areas shown are merely illustrative of the preferred types of grating, and that the invention contemplates the use of any other suitable type of grating.

If desired the optical grating may be provided on the front or convex face of the spherical spectacle lens, although it is preferred to provide the grating on the rear or concave face as shown since it is there less conspicuous and also the front face is the one which is usually ground to provide the lens with the desired refractive power.

From the foregoing, it will be seen that simultaneous macular perception in the vision of a person afflicted with the condition of strabismus is encouraged by providing the proper refractive correction for each eye, and further by dividing the light transmitted to the favored eye into a regular pattern of diffractive beams which diffract light in at least two different directions to diffuse the retinal image sufficiently that the visual acuity in the favored eye is reduced to a degree equal to at least one line of the Snellen test chart below that of the other eye whereby an incentive will be offered for the constant use of each eye.

We claim:

1. A spectacle lens for reducing the visual acuity of a good eye so as to tend to force the concurrent use and fusion with the poorer eye to alleviate the condition of strabismus in human vision which involves the suppression of the poorer eye and the favoring of the good eye, said lens having the proper refractive correction for the good eye and having on one side and over the full area thereof a diffractive grating of light transmitting and light interrupting areas arranged in a uniform pattern and the light transmitting areas having opposite edge portions spaced apart not less than about 0.001 inch and not more than about 0.015 inch so that light transmitted therethrough is diffracted in at least two different directions to cause the normally sharp outlines of light and dark demarcation of the image to be invaded by fringe band effects of sufficient width to reduce the resolving power of the eye, the closer the spacing within the aforementioned dimensional range the wider the fringe band effect and hence the greater the resolution reduction, whereby the retinal image in the good eye may be made slightly less clear than in the poorer eye.

2. A spectacle lens as set forth in claim 1, in which said light transmitting areas comprise a first series of parallel and spaced lines and a second series of similar lines perpendicular to and intersecting the first series, each of the lines in both said series having a width falling within said dimensional range, and the areas bordered by such lines being said light interrupting areas.

3. A spectacle lens as set forth in claim 1, in which said light interrupting areas comprise a first series of parallel and spaced lines and a second series of similar lines perpendicular to and intersecting the first series, such lines bordering said light transmitting areas each of which is rectangular and has a width falling within said dimensional range.

4. A spectacle lens for reducing the visual acuity of a good eye so as to tend to force the concurrent use and fusion with the poorer eye to alleviate the condition of strabismus in human vision which involves the suppression of the poorer eye and the favoring of the good eye, said lens having the proper refractive correction for the good eye and having on one side and over the full area thereof a diffractive grating of light transmitting and light interrupting areas arranged according to a uniform pattern and composed of a square array of mutually perpendicular families of parallel and equally spaced lines, the width of each line and the spacing between adjacent parallel lines falling within the range of from about 0.001 inch to about 0.015 inch, the closer said spacing within the aforementioned dimensional range the greater the acuity reduction, whereby the retinal image in the good eye may be made slightly less clear than in the poorer eye.

5. A spectacle lens for reducing the visual acuity of a good eye so as to tend to force the concurrent use and fusion with the poorer eye to alleviate the condition of strabismus in human vision which involves the suppression of the poorer eye and the favoring of the good eye, said lens having the proper refractive correction for the good eye and having on one side and over the full area thereof a diffractive grating of light transmitting and light interrupting areas arranged according to a uniform pattern and composed of a square array of mutually perpendicular families of parallel and spaced lines of the order of seventy-five to the inch, the light interrupting areas being dished recesses in the surface of said one side of the lens and the unaffected portions of such surface constituting said light transmitting areas which transmit light in the normal manner of the lens but with diffraction, whereby the visual acuity of the good eye may be reduced to a degree equivalent to at least one line of the Snellen test chart below that of the poorer eye so as to encourage simultaneous macular perception.

References Cited in the file of this patent

UNITED STATES PATENTS

| 1,270,830 | Ives | July 8, 1918 |
| 1,370,885 | Frederick et al. | Mar. 8, 1921 |
| 1,856,163 | Jones | May 3, 1932 |
| 1,903,778 | Conroy | Apr. 18, 1933 |
| 1,955,047 | Beach | Apr. 17, 1934 |
| 2,032,771 | Scherer | Mar. 3, 1936 |

FOREIGN PATENTS

| 265,379 | Great Britain | Feb. 10, 1927 |
| 630,039 | France | Aug. 27, 1927 |

OTHER REFERENCES

Emsley & Swain: Text on Ophthalmic Lenses, 1935, 3rd ed., page 299, published by Hatton Press Ltd., 72–78 Fleet St., London.

Jenkins & White: Text Fundamentals of Optics, 2nd ed., 1950, pages 228 and 252. Published by McGraw-Hill Book Co., New York.